Figure 1:
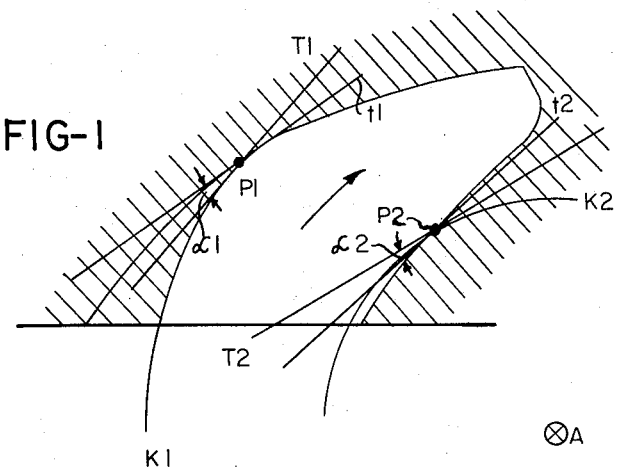

June 26, 1962 W. ULLMANN ETAL 3,041,442
ELECTRO-EROSIVE PROCESS FOR PRODUCING
RECESSES IN METALLIC WORK
Filed March 4, 1960 5 Sheets-Sheet 1

INVENTORS:
Werner Ullmann
Gilbert Waninger
BY

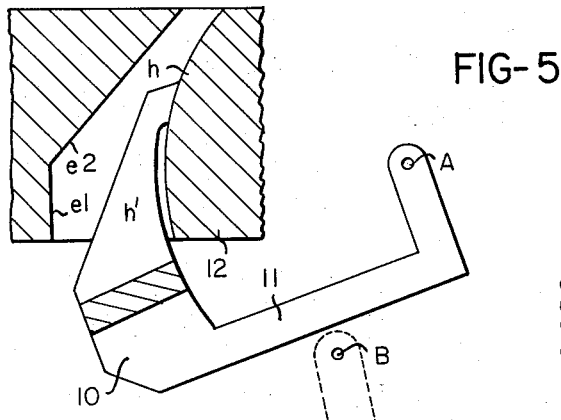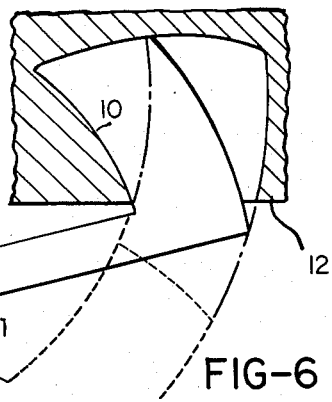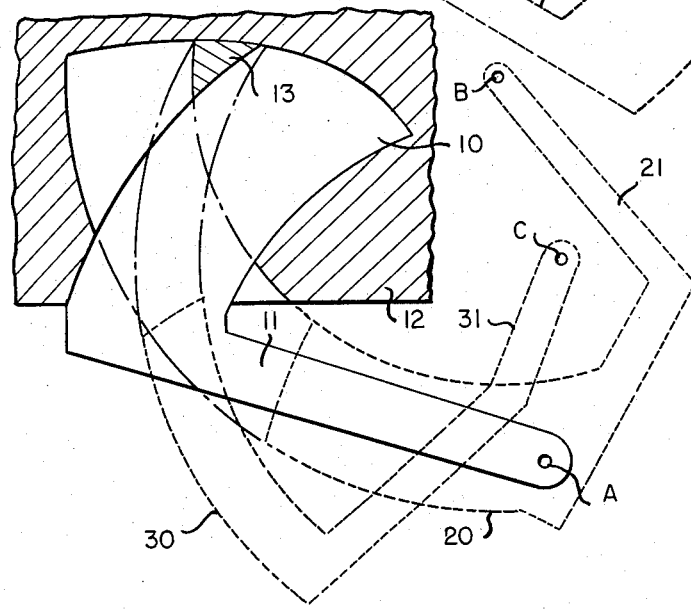

INVENTORS:
Werner Ullmann
Gilbert Waninger
BY

United States Patent Office 3,041,442
Patented June 26, 1962

3,041,442
ELECTRO-EROSIVE PROCESS FOR PRODUCING RECESSES IN METALLIC WORK
Werner Ullmann, Locarno-Monti, Switzerland, and Gilbert Waninger, Ettlingen, Baden, Germany, assignors to AGIE, A.G. für Industrielle Elektronik, Losone-Locarno, Switzerland, a company of Switzerland
Filed Mar. 4, 1960, Ser. No. 12,710
Claims priority, application Switzerland Mar. 4, 1959
12 Claims. (Cl. 219—69)

For the production of recesses in work principally material detaching processes are widely employed. Although a great number of recesses may be formed by drilling, turning, milling, grinding and the like, the shapes of the recesses so produced are basically limited since the detaching tool must perform a cutting movement transverse to the direction of feed in the interior of the work.

While a number of complex recesses may be produced by machining processes, it is obvious that production requires much time and makes considerable demands on the skill of the worker and on the machine tools. The physical accuracy of the recess is determined by the shape of the tool and its movement relative to the work.

A further important factor in detaching processes is the fact that considerable forces are built up between the tool and the work during cutting. For this reason, special steps must be taken in respect of the machine tools to prevent the wear of moving parts, and the design must be rigid while the necessary mobility of the tool and of the work is maintained.

Besides the detaching processes, spark-erosive methods have become known in the production of recesses in metallic work. With these processes, either an electrode is employed which completely fills the recess to be obtained and which is linearly moved into the work. Such processes are applied, by way of example, to shape dies. In addition, electrodes have been known to be used which do not fill the recess to be produced but which are moved in such a manner that they operate as the generatrices of the bore. By way of example, a conical recess may thus be obtained by a pin-type electrode which describes the cone to be produced within the work. It is also known to manufacture threaded cylindrical or conical recesses by turning an electrode, which completely fills the recess, into the work in accordance with the thread to be produced.

In technical applications, recesses are often required which cannot be obtained by the electro-erosive processes so far known and which would therefore require the classical detaching methods described above, which would in turn entail the disadvantages recited.

The present invention relates to an electro-erosive process for producing recesses in metallic work of which at least one boundary face is curved and in which parts only of opposing boundary faces are parallel at best. So far it has not been possible, or possible only with difficulty, to produce such recesses.

According to the present invention, an electrode is employed of which at least a portion is shaped to correspond to the recess to be produced. The invention is characterized by the fact that the electrode is swivellably arranged on an axis stationary relative to the work and swivelled into the work, the position of the axis of rotation in respect to the recess to be produced being so selected that the tangent of each point of the recess surface forms an angle with the arc passing through this point about the axis of rotation as the inner leg seen from the recess, the said angle being between 0° and 80° viewed in the direction of rotation of the electrode.

This arrangement enables the said recesses to be produced without much difficulty, a high degree of dimensional accuracy being maintained. In production, the electrode may also perform periodical oscillations in the direction in which it is swivelled into the work, which is desirable in many cases.

According to this invention, the process is applied in the manufacture of scavenging ducts, filling and exhaust ducts in fluid flow, expansion and compression engines.

Figure 2:
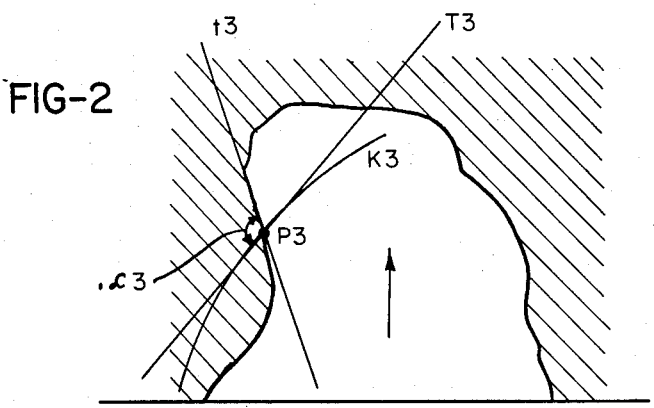
Figure 3:
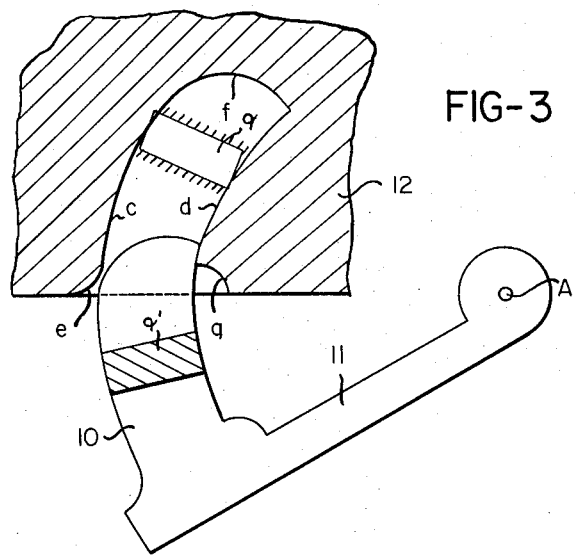
Figure 4:
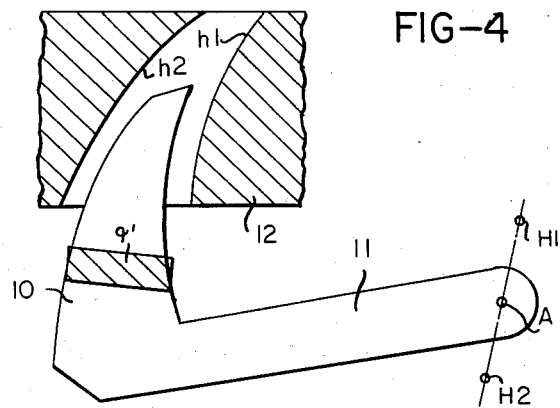
Figure 8:
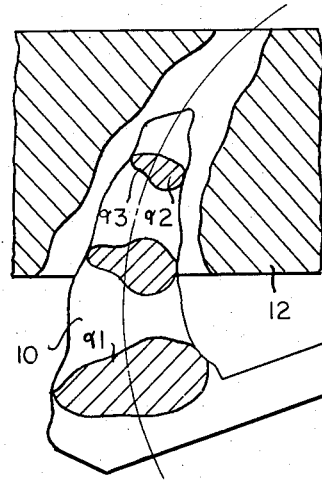
Figure 9:
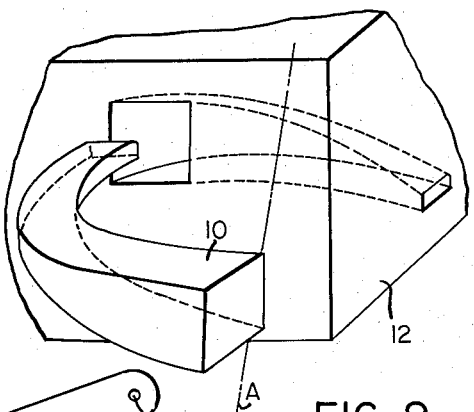
Figure 10:
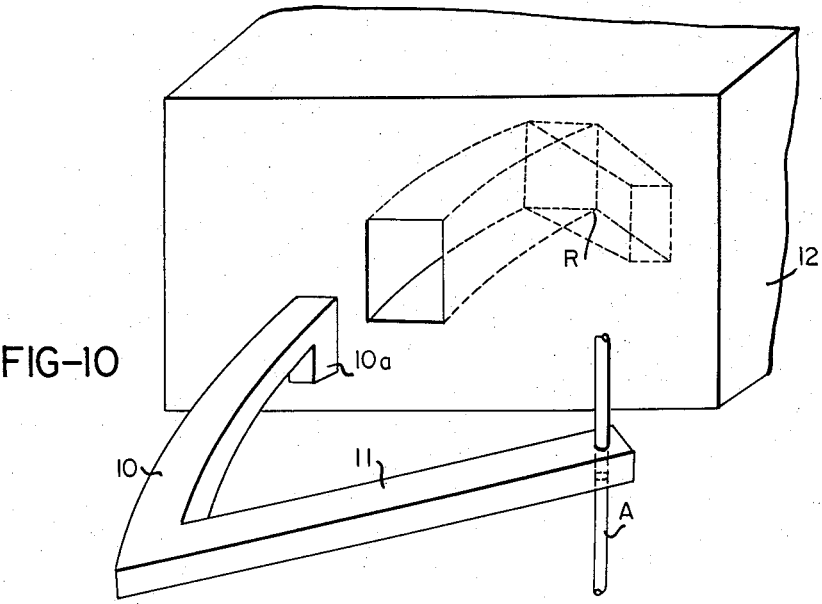
Figure 11:
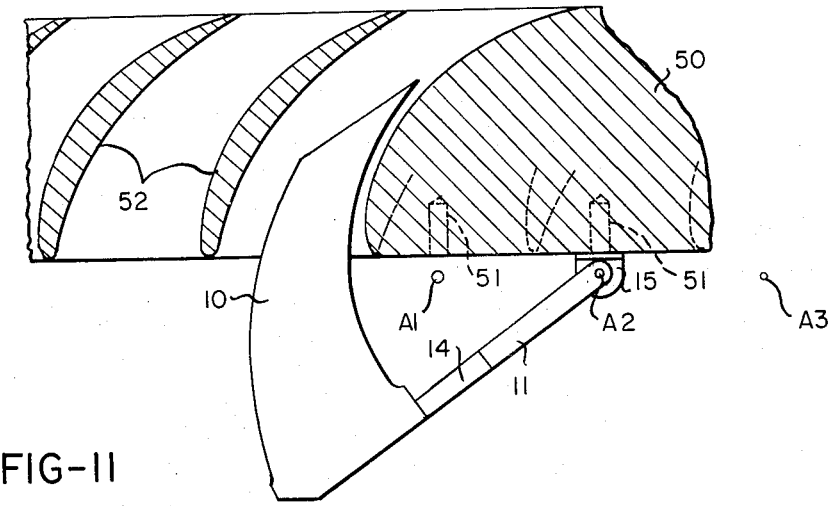
Figure 12:
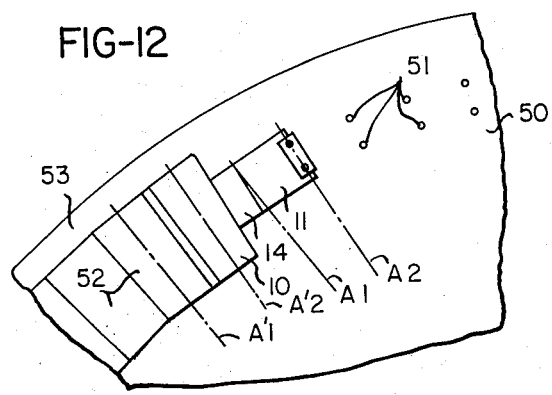

The process according to this invention is described in greater detail in conjunction with a number of examples shown in the drawing in which:

FIGS. 1 and 2 show recesses to be formed for the explanation of the conditions to be met;
FIGS. 3 through 5 show the production of specially shaped recesses by means of an electrode;
FIGS. 6 and 7 show cases where several electrodes are employed to produce a continuous recess;
FIGS. 8, 9 and 10 show more general embodiments of the process, and
FIGS. 11 and 12 show the application of the process in the manufacture of turbine vanes.

In explanation of the preconditions that must be met in the production of recesses according to the invention, reference is made to FIGS. 1 and 2. FIG. 1 is a section of a recess to be produced. For the sake of simplicity it may be assumed that the recess is prismatic. The recess is now to be made by an electrode filling it completely which is swivellable about point A and which is swivelled into the work in the direction of the arrow. In order to determine that the recess can actually be produced with the point A selected, two points $P_1$ and $P_2$ are considered. Passing through point $P_1$ is, on the one hand, the tangent $t_2$ to the borderline of the recess, the arc $K_1$ with A as its centre, and the tangent $T_1$ to the arc $K_1$. The tangent $T_1$ and tangent $t_1$ enclose an angle $\alpha_1$. The characteristic feature of angle $\alpha_1$ is that its inner leg, i.e. the leg adjacent the recess, is always formed by the tangent $T_1$. The relative recess can be produced with a point A as the swivel point if this angle $\alpha_1$, viewed in the direction of rotation, is in the range between 0° and 90°. As seen from the drawing, this condition is met in respect of point $P_1$.

Passing through the optional point $P_2$ are the tangent $t_2$ to the border line of the recess at this point, the arc $K_2$ about swivel point A and the tangent $T_2$ through this point on the arc. The tangents $T_2$, $t_2$ enclose an angle $\alpha_2$, the tangent $T_2$ to the arc $K_2$ forming the inner leg when viewed from the recess. In this case, too, the angle $\alpha_2$ is acute in the direction of rotation. Point A is properly selected for a recess to be produced or for a portion of such a recess if the preconditions described in connection with the points $P_1$ and $P_2$ apply for all points of the borderline and, respectively surface of the recess or of part of the recess, i.e. the swivel point for the electrode must be so selected that the following condition is met for each point on the surface of the recess: The tangent of the borderline through a point and the tangent to the arc passing through this point with the swivel point of the electrode as its centre must, when viewed in the direction of rotation, enclose an acute angle, the leg adjacent the inside of the recess being always formed by the tangent to the arc.

In further explanation of these conditions, reference is made to FIG. 2 in which this condition is not met. The arc $K_3$ about swivel point A through a point $P_3$ has the tangent $T_3$ in this point; the tangent to the borderline of the recess is $t_3$. The angle enclosed by these tangents of which the tangent $T_3$ forms the leg adjacent the recess when viewed in the direction of rotation (arrow), is $\alpha_3$. As this angle is obtuse, i.e. greater than 90°, the recess cannot be made with the swivel point A. As can easily be seen, the recess can be produced e.g. with the swivel point A'.

As subsequently discussed, non-prismatic recesses can be made with the process according to this invention, exactly the same criteria being applicable.

To simplify matters, we will now consider not the angle between tangents T and t, but the angle between tangent t and arc K; it is obvious that the angle is between a straight line with the tangent to the arc.

FIG. 3 shows a finished recess in the work 12 by a section normal to the axis A. The electrode with which this recess has been made according to the electro-erosive method comprises the active portion 10 involved in the removal of material, and the arm 11. The electrode is swivelled into the work for the production of the recess, in the direction of the arrow and about the axis A which is stationary relative to the work 12. This swivelling motion is continued until the active portion 10 is completely inside the work. In the present case, the portion 10 completely corresponds to the shape of the recess.

As the indicated cross-sections $q$ and $q'$ of the recess and, respectively, the electrode show, the recess and the electrode are bounded below and above by two planes arranged parallel to the cutting plane. The lateral border of the recess is located along two concentrical arcs $c$ and $d$ partly opposite one another, which pass into further curved surface areas $e$, $f$ and $g$.

The position of the swivel axis A of the electrode is such that it coincides with the common central axis of the arcuate bordering faces $c$ and $d$ so that the tangents to the arc about A and the borderlines $d$ and $c$ coincide, i.e. enclose and angle of 0°. This meets the above condition.

FIG. 4 represents, in a manner similar to that of FIG. 3, the production of another recess passing through the work 12 by means of the electrode 10, 11. The recess possesses two opposite arcuate, non-concentrical bordering faces $h_1$ and $h_2$ with the parallel axes $H_1$ and $H_2$. The shape of the electrode or of the active portion 10 corresponds to the shape of the recess. With this desired recess shape, various positions of the electrode swivel axes are possible, which meet the above-cited conditions; the two extreme positions being shown by the axes $H_1$ and $H_2$. The swivel axis, however, may also be located between $H_1$ and $H_2$ in the connecting plane. In order to ensure uniform burning of the electrode on both side flanks, it is advantageous to place A at least substantially in the middle between $H_1$ and $H_2$ as indicated.

The recess according to FIG. 5 is bordered, on the one side, by an arcuate surface $h$, and by two flat faces $e_1$ and $e_2$. The position of the swivel axis A here coincides with the axis of the face $h$. The shape of the electrode corresponds to that of the recess only in respect of the covering faces and the flat bordering faces $e_1$ and $e_2$. Only the foremost portion of the electrode is adapted to the face $h$; further back the electrode is clear of the face of the recess since this portion $h'$ should not and cannot cause further erosion. This portion of the electrode therefore need not be machined accurately.

FIGS. 3, 4 and 5 represent cases in which the entire recess is produced by means of a single electrode. If necessary, one may swivel several electrodes into the work one after the other of which each removes a portion of a continuous recess.

Such an example employing two electrodes is shown in FIG. 6. One electrode 10, 11 is shown in its terminal position in the work in full lines, the other electrode, 20, 21 is indicated in broken lines outside the work and its path while being swivelled into the work is indicated in dot-dash lines. When producing this recess, the first electrode is swivelled out after it has reached its terminal position and the second electrode is swivelled in so that it will erode the remaining material of the recess to be formed.

In accordance with the desired shape of the recess, different swivel axes A, B were determined for the two electrodes so that the arcs described by points of the two electrodes are naturally not concentrical relative to one another. As regards the surface of the relative portion of the recess to be produced, the conditions described in conjunction with FIGS. 1 and 2 must be met.

In the embodiment according to FIG. 7 three electrodes 10, 11, 20, 21 and 30, 31 co-operate in producing a continuous recess which does not pierce the work. The electrodes 10, 11 and 20, 21 are swivelled into the work about their axes A and B one after the other. Their paths in the work intersect. Between the two partial recesses of the recess widening towards the inside, a rest 13 of material remains which cannot be reached by either of the first two electrodes. However, it is in the path of the third electrode which is last swivelled into the work about its axis C and thus erodes the said rest of material.

In this figure, too, only the first electrode is shown in full lines its terminal position in the work, while the two other electrodes are outside the recess and indicated in broken lines; their paths are shown in dot-dash lines.

Apart from the recesses shown, of which the shapes are more or less reguler, the present process enables extremely diversified shapes of recesses to be produced. An example of an entirely irregular shape is represented in FIG. 8; three cross-sections $q_1$, $q_2$ and $q_3$ are shown in the associated electrode. An arc with which the surface converges and which determines a possible swivel axis A of the electrode is indicated by dot-dash lines. The existence of such an arc is a criterion for the fulfilment of the conditions discussed in conjunction with FIGS. 1 and 2 if the centre of this arc is the centre of the swivelling motion of the electrode. If several electrodes which are swivelled on various axes and of which each removes a partial recess consecutively are employed, the applications of the process can be multiplied.

If necessary, the swivel axis of the electrode can naturally be located so as to form an angle with the edges of the work, as indicated in FIG. 9.

As explained in conjunction with the disclosed embodiments of the process, the electrode always performs a simple swivelling movement in the production of the recess. This movement is performed about an axis stationary relative to the work, however complex the shape of the recess may be. Naturally this constitutes a very considerable simplification over machining operations, quite apart from the fact that many of the shapes obtainable with the process according to this invention could not be formed by a detaching process. A circular movement about a stationary axis may be performed with very little technical difficulty and it can be very accurately reproduced, more simply and more accurately e.g. than a straight movement. This naturally favourably affects the accuracy of the recesses produced according to the present process. Naturally the shape of the electrode is also a determining factor for the shape of the recess, but the accurate machining of the outer surfaces of the electrode offers comparatively little difficulty.

FIG. 10 shows an embodiment of the process in which the electrode has its front end provided with a thickened portion in the shape of a downwardly extending end 10a. If the front edge of the electrode has reached point R of the recess in the work, it is lowered on the swivel axis A—e.g. continuously—while it is further fed into the work. This gives the further portion of the recess the shape indicated. Recesses of this type are often desirable for cooling ducts e.g. in cylinder blocks.

The process according to this invention produces a great simplification of the manufacture of recesses between the individual vanes of turbines both for stators and rotors. FIG. 11 shows a developed section of a turbine wheel during manufacture of the recesses.

In particular with steam turbines which may have their vanes arranged and shaped as shown in the figure, the high vane loads often require an annular strap 53 which interconnects the vanes. With the previous detaching processes, the only possible procedure was for the wheel to be given a diameter extending only to the outer vane ends. After milling the interstices, the strap 53 was then applied as a separate ring and the vane ends individually connected to this strap. But even the slightest unbalance extant in the ring itself or due to assembling detrimentally affects the product in view of the high operating speeds.

For the application of the process according to this invention, the wheel body 50 having a diameter that also includes the ring 53 is formed of a single piece. At the required points between vanes, guide bores 51 are provided, preferably at points which will subsequently be removed. The means of rotatable attachment of the electrode to the wheel is a hinge body 15 provided with pins which fit into the bores. The consecutive positions of the swivel axes $A_1$, $A_2$, $A_3$ etc. are determined in this manner. Insulation of the electrodes against the wheel body is obtained by an insulating member 14 inserted between the arm 11 and the active electrode portion. The swivel axes $A_1$ and $A_2$ are parallel with the associated radii $A'_1$ and $A'_2$, and are displaced relative to the latter e.g. by two vane divisions.

The position of the guide bores 51 practically determines the accuracy and regularity of the vane arrangement. The said bores can comparatively easily be produced with the required positional accuracy. The advantages cited in connection with the previous embodiments are fully operative here as well so that the manufacture of a turbine wheel becomes much simpler.

While the embodiment described in FIGS. 11 and 12 relates to the manufacture of a turbine rotor, a turbine stator may be produced in the same manner. It may, by way of example, hold the deflecting vanes for the medium. As is well known, the deflecting vanes are provided for the purpose of deflecting the flow direction of the medium emerging from, say, the Curtis wheel in such a manner that a wheel arranged downstream is again driven in the same direction by the medium. Since the wheels arranged downstream frequently have a diameter larger than those located upstream, the deflection vanes or deflection nozzles must continue to deflect the medium outward in the radial direction. If the electrode is displaced on its axis (as shown in FIG. 10) during its passage into the work and if the electrode head is larger than the electrode shaft, this cannot readily be achieved. In certain cases it may become necessary for the recesses of turbine stators to be produced from both sides.

Having now particularly described and ascertained the nature of our said invention and in what manner the same is to be performed, we declare that what we claim is:

1. A process for the electro-erosion of material from a solid body to form recess means therein wherein at least one bordering face of the recess means is curved while the opposed bordering face is not more than partly parallel thereto, said electro-erosion being carried out by a tool electrode; pivotally supporting the electrode on an axis stationary relative to the work, and moving the electrode about its pivotal support into the work, the axis of said pivotal support for the electrode with respect to the recess to be formed by the electrode tool being such that the tangent at each point of the bordering faces of the recess forms an angle with a tangent at the same point to the arc swung from said axis through said point which angle falls within the range of from zero degrees to ninety degrees, said last mentioned tangent forming the inner leg of said angle with respect to the recess when the angle between the said tangents is selected so that it converges in the direction of movement of the electrode tool into the same solid body.

2. A process according to claim 1 for producing recesses in which the opposite bordering faces are arcuate and non-concentric, said faces being arcuate about spaced parallel axes, in which the said axis of the pivotal support of the electrode tool is parallel to and located between the axes of the said bordering faces.

3. A process according to claim 1 for producing recesses in which the opposite faces of the recesses are arcuate and non-concentric, said faces being arcuate about spaced parallel axes, in which the axis of the pivotal support for the electrode tool is parallel to said axes of the bordering faces and is located between the said axes of the bordering faces in the plane connecting said axes.

4. A process according to claim 3 in which the axis of the pivotal support for the electrode tool is located midway between the said axes of the said bordering faces whereby the electrode tool will burn substantially evenly on both sides.

5. A process for the electro-erosion of material from a solid body to form a recess therein, said electro-erosion being carried out by a plurality of electrode tools, said recess having opposed arcuate bordering faces, said bordering faces being arcuate about predetermined axes which comprises; pivotally supporting at least two electrode tools on predetermined axes, and successively moving the electrode tools about their respective axes into the solid body whereby each electrode removes a portion of the recess, a tangent through each point on the opposed surfaces of the recess forming an angle to a tangent through the same point to the arc swung about the pivot axes of the electrode tool which forms the said surface, said angle being within the range of zero to ninety degrees and said angle being measured between the tangents with the last mentioned tangent on the inside with respect to the recess with the angle converging in the direction of movement of the electrode tool into the work.

6. A process according to claim 5 in which there are at least two electrodes having different and parallel pivot axes.

7. A process according to claim 5 in which there are three electrode tools pivotally supported on respectively different parallel axes so that two of the electrode tools move in paths which intersect inside the recess so as to form a recess which widens in the direction of movement of the electrode tools, while the third electrode follows a path intermediate the paths of the other electrode tools so as to remove material from the body at the base of the recess between the material removed by the first two electrodes.

8. A process according to claim 1 in which the electrode tool is moved axially of its pivot axis while disposed within the said body to form a recess wider in the axial direction than said electrode tool.

9. A process for the electro-erosion of material from a solid body to form recesses therein wherein the recesses are formed with bordering faces that are arcuate about respectively spaced axes that are both located to one side of the central axis of the recess which comprises; pivotally supporting electrode tool means on axis means spaced from both of said axes and also on the said one side of the central axis of the recess, said axis means being located so that an arc swung therefrom corresponding to the arc of movement of a point of the pertaining electrode tool means into the solid body will be parallel with or converge with the bordering faces of the recess to be formed by the said pertaining electrode tool means, in the direction of movement of the pertaining electrode means into the said solid body, mounting said axis means directly on the solid body, and moving the electrode tool means about said axis means and into the said solid body.

10. A process according to claim 9 in which a plurality of adjacent recesses are formed in uniformly spaced relation in the solid body and each said axis means for each recess being provided on the solid body where another of the said recesses will subsequently be located.

11. A process according to claim 10 in which the solid body is a turbine stator.

12. A process according to claim 9 in which the said solid body is a turbine stator and a plurality of recesses is formed therein in circumferentially spaced relation with the material remaining between adjacent recesses forming the guide vanes for the stator, said solid body having bores formed therein for attaching to the solid body pivot members to define the pivot axes for the electrode tool means that form the recesses in the solid body, said bores being located on said solid body where recesses are to be formed therein so that the finished work member is free of the said bores.

References Cited in the file of this patent

UNITED STATES PATENTS 2,902,584    Ullmann _____ Sept. 1, 1959